United States Patent [19]

Schwartz

[11] 4,433,912
[45] Feb. 28, 1984

[54] METHOD AND A CIRCUIT FOR DETERMINING A CONTOUR IN AN IMAGE

[75] Inventor: Robert Schwartz, Setauket, N.Y.

[73] Assignee: Dr. Ing. Rudolf Hell GmbH, Kiel, Fed. Rep. of Germany

[21] Appl. No.: 341,525

[22] Filed: Jan. 21, 1982

[51] Int. Cl.³ .......................................... G05B 19/405
[52] U.S. Cl. .................................. 356/150; 356/152; 250/202
[58] Field of Search ............... 356/150, 152, 399, 400; 250/202; 318/577

[56] References Cited

U.S. PATENT DOCUMENTS

| | | | |
|---|---|---|---|
| 3,497,694 | 2/1970 | Jura et al. | 250/202 |
| 3,634,689 | 1/1972 | Ejiri et al. | 250/202 |
| 3,970,391 | 7/1976 | Johnson et al. | 356/400 |
| 4,160,199 | 7/1979 | Bardwell | 250/202 |
| 4,277,169 | 7/1981 | Krieg | 356/152 |
| 4,300,170 | 11/1981 | Sakamoto | 250/202 |

*Primary Examiner*—R. A. Rosenberger

*Attorney, Agent, or Firm*—Ernest F. Marmorek

[57] ABSTRACT

In a method and a circuit for determining a contour-defining angle formed by a contour in an image within a relatively small region thereof with a predetermined direction, the steps include selecting the region so that said contour passes as closely as possible through a center thereof, and subdividing the region into a number of sectors of substantially equal areas distributed substantially symmetrically about its center, and separated from one another by respective separation lines, the number being an even number and at least four, and one of the separation lines coinciding with the predetermined direction, obtaining brightness signals from each of the sectors in dependence of the proportion of the dark-to-light areas extending over each respective sector, generating difference signals from respective oppositely disposed sectors, processing the difference signals so as to identify the sector in which the transition from the light area to the dark area occurs, and determining by further processing the contour-defining angle.

12 Claims, 9 Drawing Figures

METHOD AND A CIRCUIT FOR DETERMINING A CONTOUR IN AN IMAGE

BACKGROUND OF THE INVENTION

The present invention relates to an electronic photocopying and printing technique.

In an engraving apparatus for printing rastered or non-rastered images, an image to be reproduced is scanned by the photo-electric scanner point by point and line by line, and the image signals so obtained corrected according to the requirement of the photocopying process. The corrected image signals control a recording member, which generates the rastered or non-rastered print on a carrier. In an engraving apparatus the formation of the raster point on a cylinder is accomplished by means of an engraving stylus of an electromagnetic engraving means, or by the energy beam of a generator of such an energy beam, while in a scanner the reproducing means is a light modulated light source for rastered or non-rastered illumination of films or printing plates.

The images to be reproduced are, in most cases, combinations of continuous tone pictures having soft contours (small changes in tone value) or letters or characters, such as graphical representations having hard contours (large changes in tone values).

The exact reproduction of contours in a rastered print results in particular problems. While a contour may be arbitrarily positioned with respect to a scanner, such a contour can normally be reproduced by the raster points or pixels successively arranged in the recorded raster only approximately. For example a contour subtending a transverse angle with the direction of reproduction may be reproduced showing an annoying step structure.

In order to smooth contours of this type it is already known to displace those raster points which are positioned within the region of the contour from their respective exact positions in the printing raster. In the known solution the position of a contour on the scanning side is, however, determined only in a coarse manner, and on the reproducing side the raster points are displaced merely at right angles to the direction of scanning, so that the reproduction of any contour approximately perpendicular to the scanning direction cannot be corrected at all.

When using an energy beam to generate raster points, it is possible to displace raster points in an arbitrary direction from the printed raster, as an energy beam may be deflected free of any inertia effects, and can be rapidly switched in or out, so that contours, which subtend an arbitrary angle with the printing raster, can be smoothed by displacement of the raster points. It is a precondition for such a solution, however, that the position of the contour is known not only with respect of the exact passage of this contour through the point or region being scanned, but also with respect to the direction it subtends with the direction of scanning, so that this angle must be determined exactly, which has not yet been satisfactorily accomplished hitherto.

SUMMARY OF THE INVENTION

One of the principal objects of the invention is to obtain a method and a circuit for determining the angle a contour subtends with the direction of scanning in an image.

This object is attained in a method of determining a contour-defining angle formed by a contour in an image within a relatively small region thereof with a predetermined direction, the contour being defined by the transition from a light area to a dark area within the region, by steps comprising selecting the region so that the contour passes as closely as possible through a center thereof, and subdividing it into a number of sectors of substantially equal areas distributed substantially symmetrically about its center, and separated from one another by respective separation lines, the number being an even number, and at least four, one of the separation lines coinciding with the predetermined direction, obtaining brightness signals from each of the sectors in dependence of the proportion of the dark-to-light areas extending over each respective sector, generating difference signals from respective oppositely disposed sectors, one of the difference signals being associated with the transition from the light area to the dark area having a value below a maximum value obtained from each of the remaining different signals, save the difference signal associated with the transition from the dark area to the light area, thereby identifying the sector in which the transition from the light area to the dark area occurs, and determining a first angle-defining quotient of the difference signal obtained, on one hand, from the so identified sector and the sector adjacent thereto, as viewed along a prearranged angular direction, and, on the other hand, from one of the difference signals having the maximum value, whereby the contour-defining angle is obtained as the sum of the first angle and a second angle which is subtended between the predetermined direction and the one separation line, as viewed along the prearranged angular direction.

Further objects and advantages of the invention will be set forth in part in the following specification, and in part will be obvious therefrom without being specifically referred to, the same being realized and attained as pointed out in the claims hereof.

BRIEF DESCRIPTION OF THE DRAWINGS

For a fuller understanding of the nature and objects of the invention, reference should be had to the following detailed description, taken in connection with the accompanying drawings in which.

DESCRIPTION OF THE PREFERRED EMBODIMENTS

Figure 1:
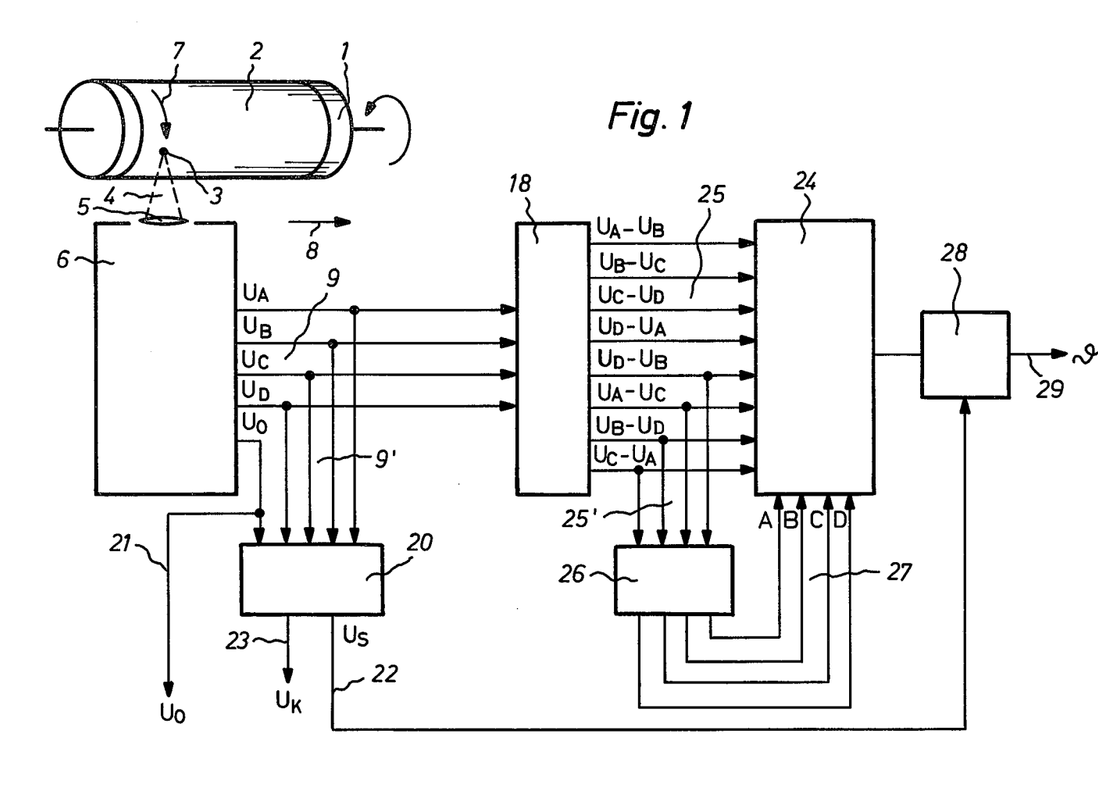
FIG. 1 is a schematic block diagram for determining the angle a contour subtends with the direction of scanning in an electronic image reproduction apparatus.

In carrying the invention into effect, there is shown in FIG. 1 a block circuit diagram for determining the direction of a contour, or the angle a contour subtends with the direction of scanning in an electronic image reproduction system, with the scanning portion only being shown. The electronic image reproduction apparatus is, for example, a scanner, or an engraving apparatus.

On a rotating scanning drum 1 there is disposed an image 2, which may contain continuous tone images, letters or figures, or characters and graphic representations, each having arbitrary contours. The image 2 is illuminated by a point of light 3 from a (non-illustrated) light source, point by point, and line by line. In an image reflecting the light, the reflected light is modulated, and in a transparent image the light passing through the image is modulated, and passes through a lens 5 into a scanning subsystem 6, movable at an angle perpendicular to the direction of scanning 7, actually along the scanning drum 1 in the direction of the arrow 8.

The scanning subsystem 6 transforms the scanning light beam 4 into an image signal $U_o$, and in the implementation example discussed into four sector signals $U_A, U_B, U_C, U_D$ which appear on leads 9. The generation of the image signal $U_o$, and of the four separate signals $U_A$ through $U_D$ will be explained first with the aid of FIGS. 2 and 3.

Figure 2:
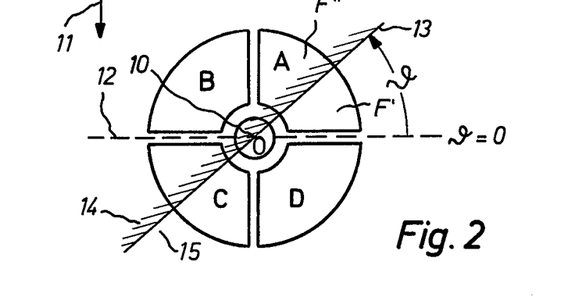
FIG. 2 is a schematic illustration of a region containing a contour passing through its center.
Figure 3:
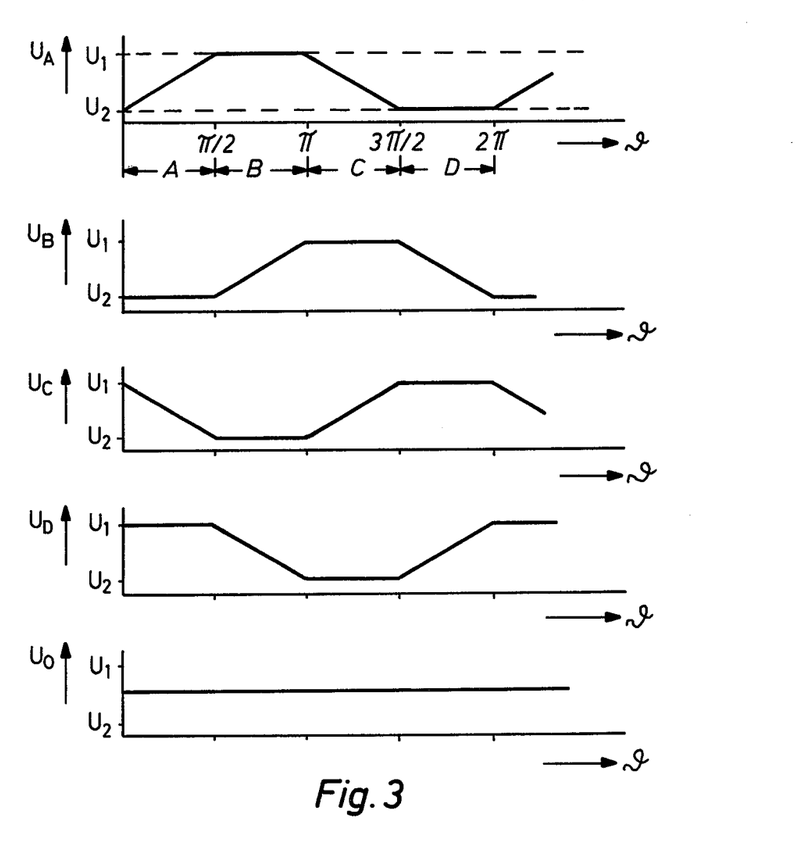
FIGS. 3a through 3f show various signal waveforms being obtained during the inventive process.

In FIG. 2 there will be seen a circular scanning region O, designated as the image point having a center 10, and an even number of not less than four sectors distributed substantially symmetrically and concentrically about the center 10, in the example shown as four quadrants A,B,C, and D. The area covered by the quadrants A,B,C, and C, corresponds approximately to the magnitude of the light point 3.

There is further shown in FIG. 2 the direction of scanning by an arrow 11, and a sector separation line passing through the center 10 and at right angles to the direction of scanning denoted by the reference numeral 12. There is further shown in FIG. 2 a contour 13, assumed to be a straight line within the region of the four quadrants and the center, the contour being defined by a transition between regions having different tone values or densities, in other words, for example, between a light area and a dark area. The contour 13 is shown at a period in time, where, as a result of a relative motion between the image 2 and the scanning subsystem 6, the contour passes exactly through the center 10. Within the region 14 to the left of the contour 13 it will be assumed that the image has a dark value, and within the region 15 to the right of the contour 13 it will be assumed that the image has a light value. The transition from the light region to the dark region of the contour 13 is shown as subtending an angle $\theta$ with the reference or separation line 12, which is required to be determined.

The image signal generated in the direction of scanning 6-$U_O$ is a measure for the brightness of the scanning region 0 or of the image point 3, and the sector signals $U_A$ through $U_D$ are a measure for the brightness of the regions defined by the respective sectors A through D, or the average brightness of all the pixels of those picture points encompassed by the sectors A through D.

FIGS. 3a through 3f show the image signal $U_o$ and the four sector or quadrant signals $U_A, U_B, U_C, U_D$ as a function of time in dependence of the angle $\theta$ for the case where the transition from a light area to a dark area of the contour 13 completes a full revolution with respect to the reference line 12 ($\theta = 0$) in a counterclockwise direction about the center 10. Furthermore, by a suitable equilization of the scanning subsystem 6 care has been taken that the image signal $U_o$, and the quadrant signals $U_A$ through $U_D$ have the same signal-amplitudes in case of a uniform illumination of all the surfaces of the quadrants. In the signal waveforms representing the contour 13 passing through a center 10 the image value $U_o$ according to equation (1), is equal to the average value formed by the sector signals $U_A$ through $U_D$ $$U_O = U_m = \frac{U_A + U_B + U_C + U_D}{4} \quad (1)$$

By the assumed revolution of the contour 13 about the center 10, the proportion of light-area to dark-area in the respective quadrants A through D changes as a function of this revolution, and consequently the brightness in the individual regions corresponding to respective quadrants changes also. Where the signal obtained when the quadrant region as shown in FIG. 2 is light, it has a value equal to $U_1$, while it has a value equal to $U_2$ if the region shown in FIG. 2 is dark, and otherwise has a value in between the values $U_1$ and $U_2$, in dependence of the proportion of the light area and the dark area in a respective quadrant.

The angle $\theta$ between the reference line 12 and a contour 13 representing the transition from a light area to a dark area is determined as follows according to the present invention:

In a first step that quadrant is determined, which contains the light area-to-dark area transition of the contour along the set angular direction of the contour. For this purpose there are generated from the four sector signals $U_A, U_B, U_C$, and $U_D$, four respective difference signals $(U_D-U_B)$, $(U_A-U_C)$, $(U_B-U_D)$ and $(U_C-U_A)$, and the maximum difference signal or signals are determined therefrom. As can be seen from the signal waveforms of FIG. 3, each quadrant is characterized by a maximum difference signal, namely in the quadrant A the difference signal $(U_D-U_B)$ is maximum, in the quadrant B the difference signal $(U_A-U_C)$ is maximum, in the quadrant C, the difference signal $(U_B-U_D)$ is maximum, and in the quadrant D the difference signal $(U_C-U_A)$ is maximum. Consequently by selecting the appropriate maximum or maxima from the four difference signals, the associated quadrant can be determined.

Once the correct quadrant is determined, in which the transition from a light area to a dark area occurs, in a second step the corresponding angle is obtained from the previously obtained difference signals, and the additional difference signals $(U_A-U_B)$, $(U_B-U_C)$, $(U_C-U_D)$ and $(U_D-U_A)$, which will be illustrated further with respect to the quadrant A according to FIG. 2.

The total surface F of the quadrant A is divided by the contour 13 into two partial surfaces F' and F", where the partial surface F' corresponds to the light area, and the partial surface F" corresponds to the dark area on respective sides of the contour 13. The partial surfaces F' and F" depend on the angle $\theta$ as follows:

$$F' = \frac{\theta}{\pi/2} F_0 \quad (2)$$

-continued $$F'' = \frac{\pi/2 - \theta}{\pi/2} F_O$$

$$F_O = F' + F''$$

Consequently the quadrant signal $U_A$ also consists of two partial signals $U'_A$ and $U''_A$ proportional to respective surfaces within the sector $U_A$ on each side of the contour 13, wherein $U'_A = U_1$, when $F' = F_o$ and $U''_A = U_2$ when $F'' = F_O$.

$$U'_A = \frac{\theta}{\pi/2} U_1 \tag{3}$$

$$U''_A = \frac{\pi/2 - \theta}{\pi/2} U_2$$

As in the assumed rotation of the contour 13 $U_B = U_2$, and $U_D = U_1$, the signal $U_A$ is shown to be $$U_A = \frac{\theta}{\pi/2} U_D + \frac{\pi/2 - \theta}{\pi/2} U_B \tag{4}$$

Consequently the angle $\theta$ for the quadrant A can be determined as follows:

$$\theta = \frac{\pi}{2} \frac{U_A - U_B}{U_D - U_B} \tag{5}$$

The angles corresponding to the respective quadrants are shown in the following table:

| Maximum Difference | Quadrant | Angle |
|---|---|---|
| $U_D - U_B$ | A | $\theta = \frac{\pi}{2} \frac{U_A - U_B}{U_D - U_B}$ |
| $U_A - U_C$ | B | $\theta = \frac{\pi}{2} \frac{U_B - U_C}{U_A - U_C} + \frac{\pi}{2}$ |
| $U_B - U_D$ | C | $\theta = \frac{\pi}{2} \frac{U_C - U_D}{U_B - U_D} + \pi$ |
| $U_C - U_A$ | D | $\theta = \frac{\pi}{2} \frac{U_D - U_A}{U_C - U_A} + \frac{3\pi}{2}$ |

The operations shown in the above-noted table are accomplished by the circuit according to FIG. 1, which will be explained in what follows.

The quadrant signals $U_A$ to $U_D$ obtained in the direction of scanning 6 are fed through leads 9 to a difference stage 18. The quadrant signals $U_A$ to $U_D$, as well as the image signal $U_o$ are fed through lead 9' to a contour recognition stage 20. Furthermore the image signal $U_o$ is fed through a lead 21 to the reproduction portion of the image reproduction apparatus, which is not illustrated.

Figure 5:
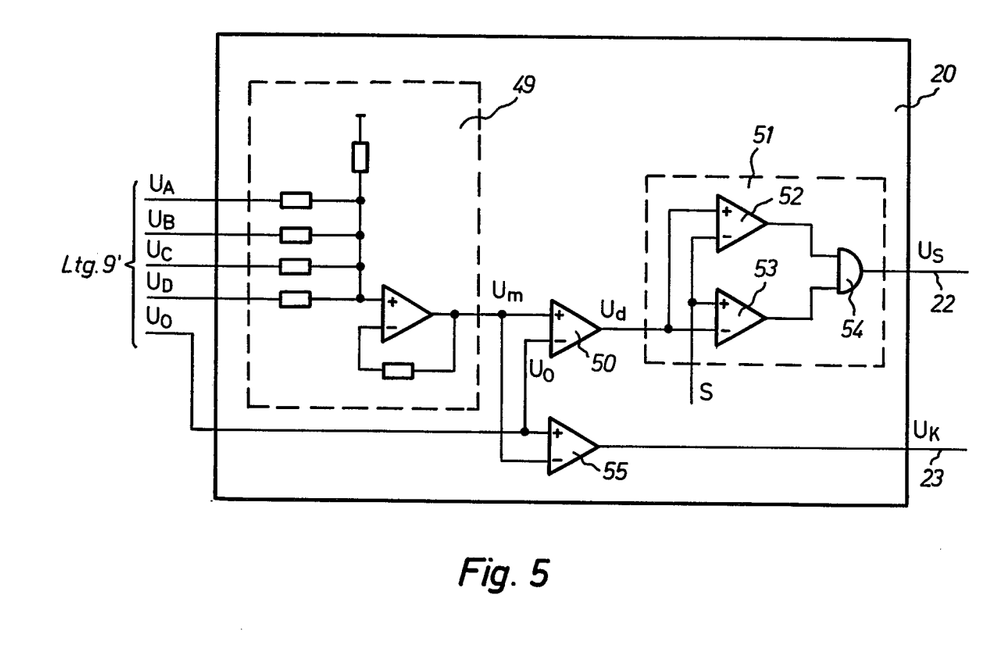
FIG. 5 is an example of implementing a contour-recognition stage.

The contour recognition stage 20, which is shown in detail in FIG. 5, generates always when a contour within the predetermined region of the image is scanned, or more accurately when the contour passes through the center 10 of a scanned central region O, (FIG. 2), a control signal $U_S$, available on a lead 22, whose function will be discussed later.

Simultaneously there can be generated in the contour recognition stage 20 a correction signal $U_K$, available on a lead 23, which serves for electronic blurring during reproduction of an image.

In the difference stage 18 there are generated 8 different signals from the quadrant signals $U_A$ through $U_D$, and fed through leads 25 to an angle calculator 24. The difference signals $(U_D-U_B)$, $(U_A-U_C)$, $(U_B-U_D)$ and $(U_C-U_A)$ are fed additionally via leads 25' to a quadrant recognition stage 26, which is shown in greater detail in FIG. 6. A quadrant recognition stage 26 recognizes, according to Cols. I and II of the previous table the corresponding quadrant A through D, and supplies corresponding quadrant recognition signals A through D via leads 27 to the angle calculator 24. The angle calculator 24 determines from the eight difference signals on the leads 25 according to Col. III of the previously identified table the corresponding angle $\theta$ in dependence of the recognized quadrant. An AND gate controlled by the control signal $U_S$ on the lead 22 insures that the angle $\theta$ is only passed to the lead 29, if the contour is in the required exact position needed for angle determination, namely passes through the center 10 of the central scanning region O (FIG. 2).

Figure 4:
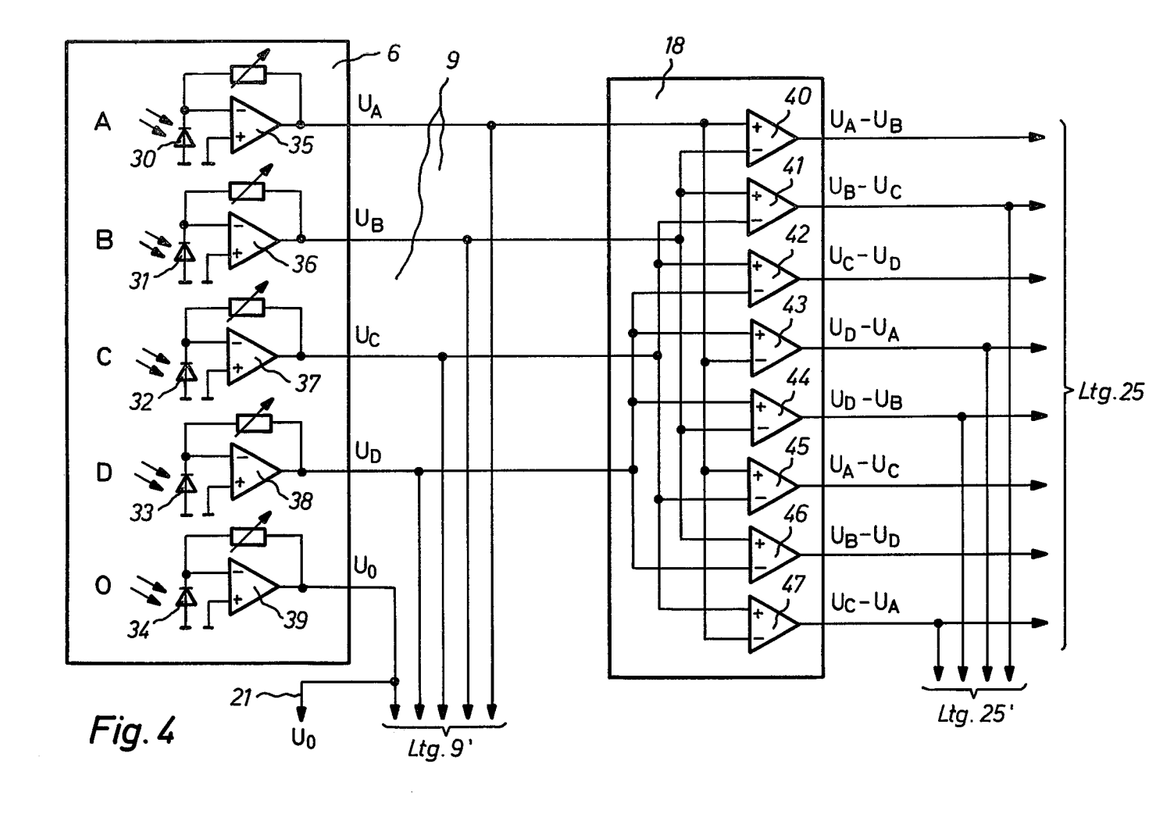
FIG. 4 is a circuit implementing the scanning stage and a difference stage.

FIG. 4 shows a manner of implementing the scanning subsystem 6 and the differential stage 18.

The scanning subsystem 6 includes, in the implementation example described, five photoelectric transducers 30,31,32,33 and 34, for example in the form of photo diodes, and also five amplifiers 35,36,37,38 and 39 post-coupled thereto, whose amplification is individually adjustable. The photoelectric transducers 30 through 34 transform the scanned signal obtained from the central scanned region O and the quadrants A through D (FIG. 2) into the image signal $U_O$, and the quadrant signals $U_A$ through $U_D$. By appropriate adjustment of the amplifiers 35 through 39 the amplification of the photoelectric transducers 30 to 34 may be equalized.

Figure 8A:
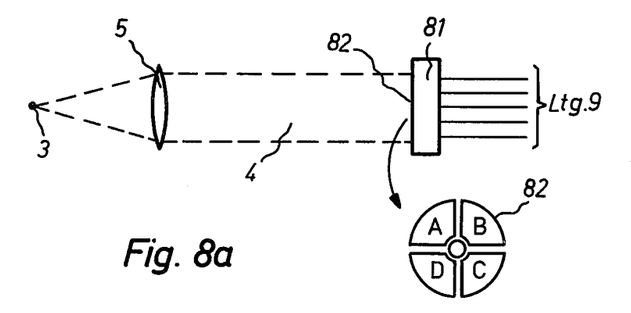
FIG. 8a is a first version of implementing the optical portion of the invention.
Figure 8B:
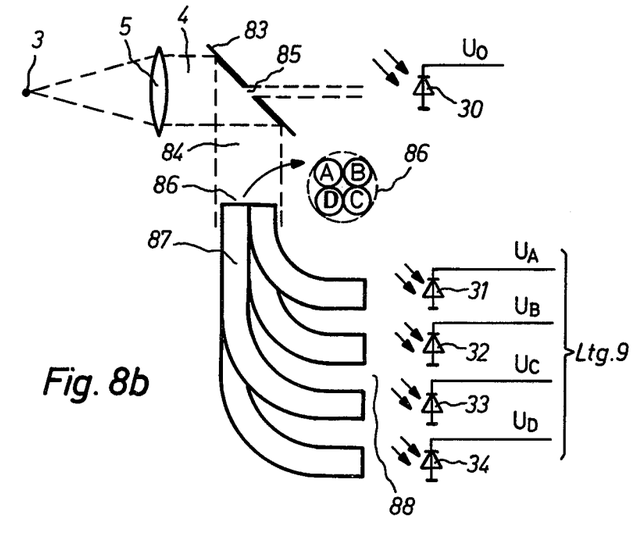
FIG. 8b is a second version of implementing the optical portion of the invention.

Optical versions of the scanning subsystem 6 are shown in FIGS. 8a and 8b. It is within the scope of the invention to use line-type photodiodes or a photodiode matrix. as photoelectric transducers for determining the image brightness of the required reference point. Another possible implementation of the scanning subsystem 6 includes a single photoelectric transducer for scanning the image, and for obtaining an image signal. A memory is postcoupled to the electronic transducer in which the digital image values are stored. In this case the signals applicable for the region scanned are calculated from the stored image signal values, which can be done, according to German Pat. No. 2,137,676. The memory may be implemented in the form of a line memory, in which the image value of the image signals of the line or of several adjacent lines, or of line segments are stored for intermediate purposes, or it can be a memory storing the picture elements of an entire frame, which contains the image values of all pixels of the image.

The difference stage 18 consists of eight difference amplifiers 40 through 47. FIG. 5 shows a version of the contour recognition stage 20.

In the average value calculator 49, which is implemented as an adding amplifier having an amplification factor of 0.25, there is formed the average value signal $U_m$ according to equation (6) from the signals $U_A$ through $U_D$ on the leads 9' as follows:

$$U_m = 0.25 (U_A + U_B + U_C U_D) \tag{6}$$

The average signal value $U_m$, and the image signal $U_O$ are fed to a difference amplifier 50, in which the difference signal $U_d$ is formed according to equation (7) as follows:

$$U_d = U_m - U_O \qquad (7)$$

Based on the previously mentioned condition for the scanning subsystem 6 the difference signal $U_d=0$, if in FIG. 2 the contour 13 passes exactly through the center 10 of the scanned region; thus the condition $U_d=0$ is a criterion for the presence of a contour in an image. In order to make recognition of the contour insensitive with respect to signal fluctuations, the difference signal $U_d$ is compared in a threshold stage 51 postcoupled to the difference amplifier 50 with a threshold value S, and a control signal $U_S$ "contour recognized" is passed to the lead 22 when the difference signal $U_d$ lies within a threshhold window $\pm S$ defined by the threshhold value S. The threshhold stage 51 consists of two comparators 52 and 53, and an AND gate 54 postcoupled thereto. The comparators 52 and 53 are, for example, integrated modules of the type LM 311 of the firm National Semiconductors, and supply TTL output peaks, so that they can be connected directly to logic circuits.

In the contour recognition stage 20 there is formed as a result of forming a second difference according to equation (8), in a second difference amplifier 50 a correction signal $U_K$ available on the lead 23, which can be used for electronic blurring.

$$U_K = U_O - U_m \qquad (8)$$

Figure 6:
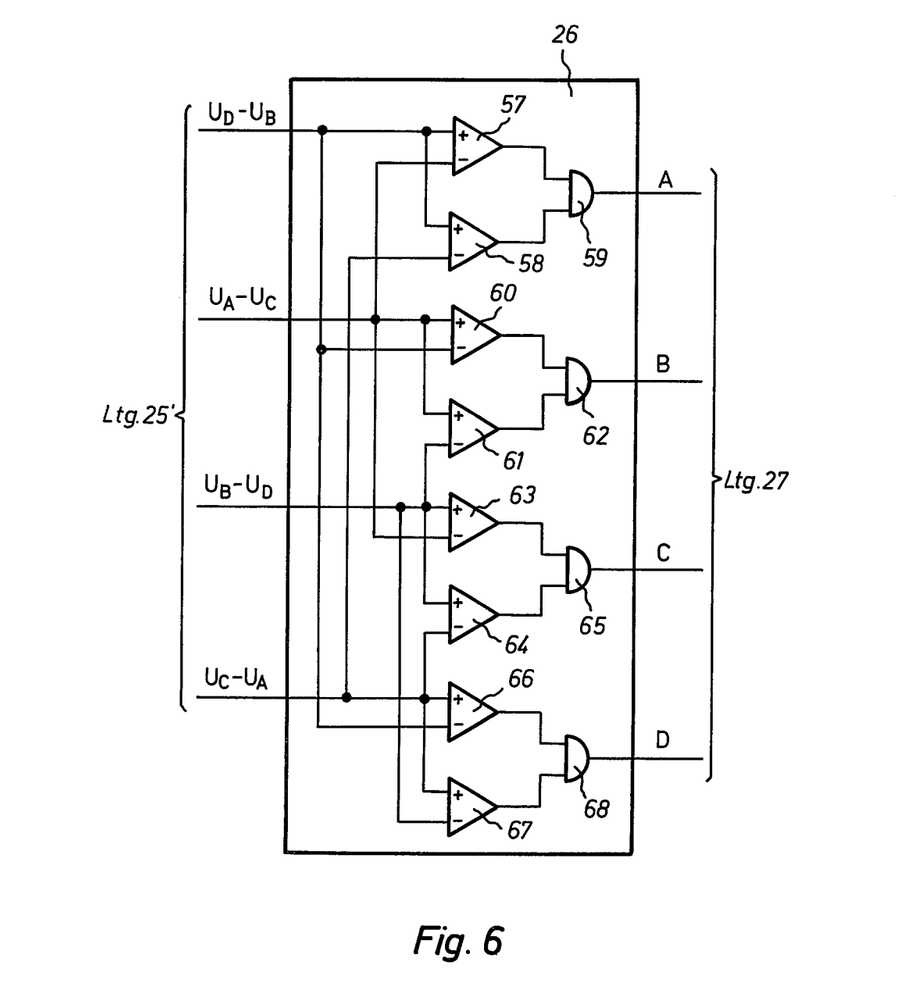
FIG. 6 is an example of implementing a quadrant recognition stage.

FIG. 6 shows a version of implementing the quadrant recognition stage 26.

The quadrant recognition stage 26 includes two comparators for each quadrant, and one AND gate postcoupled thereto, namely comparators 57 and 58 for quadrant A as well as the AND gate 59; comparators 60 and 61 for the quadrant B as well as the AND gate 62; comparators 63 and 64 for the quadrant C as well as the AND gate 65, and comparators 66 and 67 as well as the AND gate 68 for the quadrant D.

These comparators also have TTL output peaks, so that they can be connected directly to the postcoupled AND gates.

The comparators, which can be supplied according to the previously mentioned table with different signals $(U_D-U_B)$, $(U_A-U_C)$, $(U_B-U_D)$ and $(U_C-U_A)$, represent respective maximum difference signals. By evaluating the maximal difference signals in the AND gate, according to Cols. I and II of the previously mentioned table, the corresponding quadrant of the quadrants A through D are recognized.

If, for example, the difference signal $(U_D-U_B)$ has a maximum value, the output of the comparators 57 and 58 and consequently also of the AND gate 59 is a "logical high," while in other AND gates 62,65 and 68 the output is a "logical low." When the output is a "logical high" it means that the quadrant A has been recognized.

Figure 7:
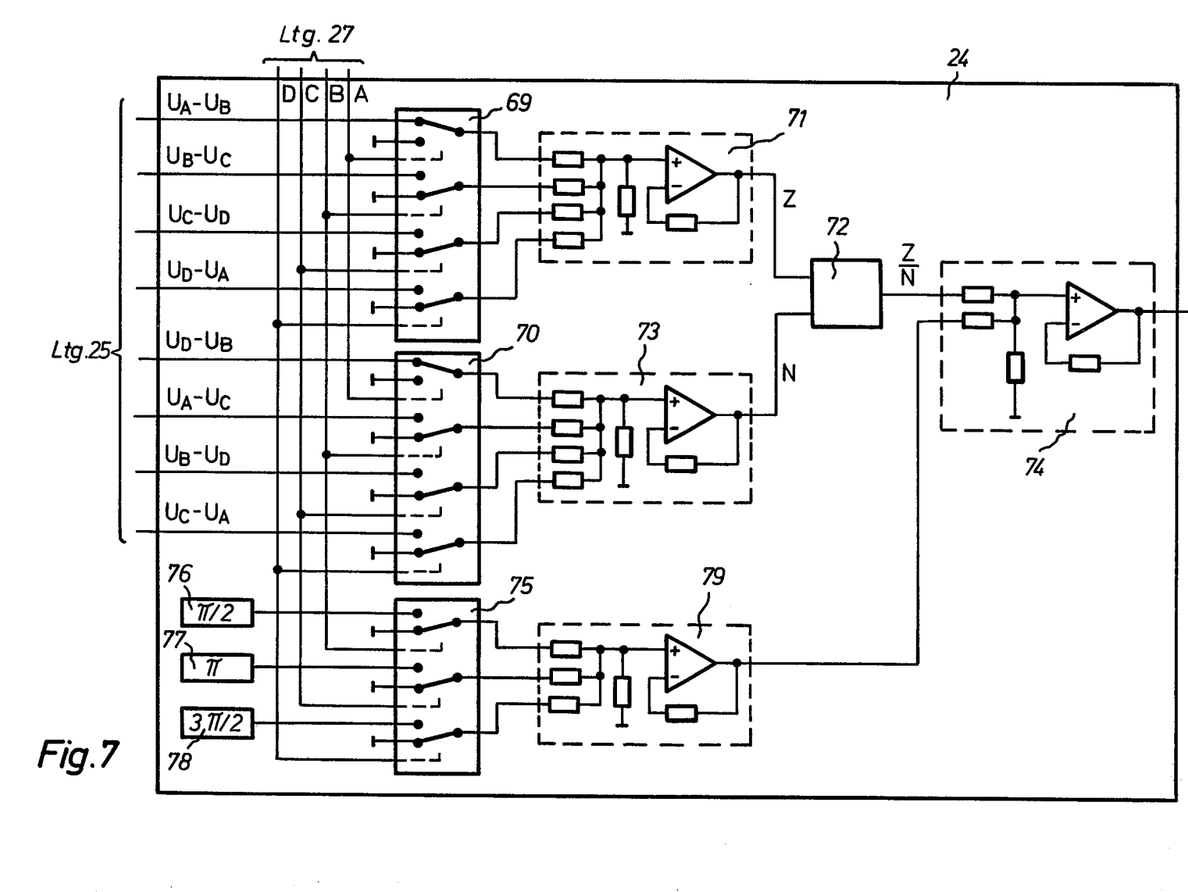
FIG. 7 is an example of implementing the angle calculator.

FIG. 7 shows an implementation example of an angle calculator.

The angle calculator 24 forms the appropriate angle for each of the quadrants A through D, according to the equations in Col. III of the previously mentioned table.

The difference signals generated by the difference stage 18 are supplied to two analog switches 69 and 70 controlled by the quadrant recognition signals A through D, which have been illustrated as mechanical switches. Integrated circuits of the type LF 11331 of the firm National Semiconductors can, for example, be employed as analog switches.

In dependence of the quadrant which is recognized from the quadrants A through D in the quadrant recognition stage 26 or the corresponding quadrant recognition signals A through D there are selected in the analog switch 69 the required difference signals which can be obtained from Col. III of the previously mentioned table for the formation of the numerator "Z," and there are obtained in the analog switch 70 the difference signals required for the formation of the denominator "N". The difference signals selected in the analog switch 69 are amplified in an amplifier 71 postcoupled thereto by the factor "$\pi/2$," and the Z signals are supplied to a divider 72. The difference signals selected in the analog switch 70 are amplified in a second amplifier 73 with the amplification factor "1," and supplied also to the divider 72 as N signals, the divider calculating the fraction Z/N. An internal clamping circuit in the divider 72 (which may be a type 436 of the firm Analog Devices) ensures that the function of the divider 72 is inhibited when $N=0$. An adder 74 is postcoupled to the divider 72, which, if necessary, adds the appropriate fraction according to Col. III of the previously mentioned table, namely "$\pi/2$," "$\pi$" or "$3\pi/2$." This is accomplished with the aid of a further analog switch 75, controlled by the quadrant recognition signals B,C, and D, so that selectively three voltage sources 76,77 and 78 representing respective values "$\pi/2$," "$\pi$" and "$3\pi/2$" feed corresponding voltages via another amplifier 79 having an amplification factor "1" to the adder 74. The output values of the adder 74 appearing on the lead 29 represent the desired angle $\theta$.

It is within the scope of the present invention to construct the aforedescribed circuit from digital components, and to calculate the angle digitally.

FIGS. 8a and 8b show two versions of constructing the optical part of the scanning subsystem 6.

In FIG. 8a there is advantageously used a photoelectric transducer 81 consisting of a so-called quadrant photodiode, for example of the type C30805 of the company RCA, on which impinges the scanned light obtained through the lens 5 in the direction of scanning 6. The quadrant photodiode 81 consists according to the region 0 to be scanned, and the four quadrants A through D surrounding the central region, of respective light entry surfaces 82, and generates five selected output signals, namely the image signal $U_O$ and the quadrant signals $U_A$ through $U_D$, appearing on the leads 9.

The optical construction of the scanning subsystem 6, according to FIG. 8b, includes a circular mirror 83, which mirror partially reflects the scanning beam 4, resulting in rays of light 84. The opening 85 in the center of the mirror 83 acts as a stop, through which the scanning beam 4 passes from the scanned region 0 onto the photodiode 30. The photodiode 30 generates the image signal $U_O$. The partially reflected light in the form of the rays 84 represents the four quadrants, respectively, and consequently four light entry surfaces 86 of an ordered bundle of optic fibers 87 receive the reflected light. The four photodiodes 31 through 34 are postcoupled to the light output surfaces 88 of the fiber optic bundle 87, and generate four quadrant signals $U_A$ through $U_D$. Alternatively the light obtained from the scanned region 0 can be passed to the photodiode by means of optical fibers, and the mirror 83 can be omitted. In the example illustrated there is only generated an image signal for scanning a dark/light region. It will be understood that the scanning arrangement is equally applicable for scanning colors.

I wish it to be understood that I do not desire to be limited to the exact details of construnction shown and described, for obvious modifications will occur to a person skilled in the art.

Having thus described the invention, what I claim as new and desire to be secured by Letters Patent is as follows:

1. In a method of determining a contour-defining angle formed by a contour in an image within a relatively small region thereof with a predetermined direction, the contour being defined by the transition from a light area to a dark area within said region, the steps comprising, selecting said region so that said contour passes as closely as possible through a center thereof, subdividing said region into a number of sectors of substantially equal areas distributed substantially symmetrically about said center, and separated from one another by respective separation lines, aid number being an even number and at least four, one of said separation lines coinciding with said predetermined direction, obtaining brightness signals from each of said sectors in dependence of the proportion of the dark-to-light areas extending over each respective sector, generating difference signals from respective oppositely disposed sectors, one of said difference signals being associated with said transition from said light area to said dark area having a value below a maximum value obtained from each of the remaining difference signals, save the difference signal associated with the transition from said dark area to said light area, thereby identifying the sector in which the transition from said light area to said dark area occurs, and determining a first angle-defining quotient of the difference signal obtained, on one hand, from the so identified sector and the sector adjacent thereto as viewed along a prearranged angular direction, and, on the other hand, from one of said difference signals having said maximum value, whereby the contour-defining angle is obtained as the sum of said first angle and a second angle which is subtended between said predetermined direction and said one separation line, as viewed along said prearranged angular direction.

2. In a method as claimed in claim 1, wherein said number of sectors is four, and each of said sectors is a quadrant, and wherein said first angle is equal to the proportion of the light area extending through the identified quadrant over the total area of said quadrant.

3. In a method as claimed in claim 1, further comprising the step of obtaining said brightness signals by sensing the brightness of each of said sectors photoelectrically.

4. In a method as claimed in claim 1, further comprising the steps of scanning said image, inclusive of said region, associated with said transition from said light area to said dark area having a value below a maximum value obtained from each of the remaining difference signals, save the difference signal associated with the transition from said dark area to said light area.

5. In a method as claimed in claim 1, further comprising the step of obtaining said brightness signals with the aid of fiberoptic means, including a plurality of fiberoptic bundles, and photoelectric transducer means post-coupled to the fiberoptic means, and wherein the light-receiving ends of said fiberoptic bundles are disposed near respective of said sectors.

6. In a method as claimed in claim 1, further comprising the steps of scanning said image point-by-point, and line-by-line, and determining when said contour passes through the center of said region by comparing an image signal from said center of said region with an average brightness signal from the entire region, whereby said contour passes through said center upon the difference signal between said image signal from the center of said region, and said average brightness signal from the entire region being zero.

7. An apparatus for determining a contour-defining angle formed by a contour in an image within a relatively small region thereof with a predetermined direction, the contour being defined by the transition from a light area to a dark area, said region including a center, comprising in combination, scanning means, including photoelectric transducer means for obtaining signals from a number of sectors within said region having substantially equal areas, and being distributed substantially symmetrically about a center thereof, said number being even and at least four, signal-difference forming means connected to said scanning means for forming difference signals from respective oppositely disposed sectors, and sectors containing said contour and respective sectors adjacent said contour-containing sectors, contour-containing sector recognition means connected to said signal-difference forming means for generating a contour-recognition signal for the sector containing the contour, a contour-defining angle calculator connected to said signal-difference forming means and to said contour-containing sector recognition means for determining the contour-defining angle, and contour-passing-through-center recognition means connected to said scanning means for determining whether the contour passes through said center, whereby, upon said contour passing through said center, said contour-differing angle calculator may be enabled by said contour-passing-through center recognition means to determine said contour-defining angle.

8. An apparatus as claimed in claim 7, wherein said number of sectors is four, and each sector is a quadrant, and said region contains four quadrants.

9. An apparatus as claimed in claim 8, wherein said photoelectric transducer means comprises a quadrant-photodiode including four light-sensitive light sensors corresponding to said quadrants, respectively, and one light-sensitive sensor corresponding to said center.

10. An apparatus as claimed in claim 7, wherein said signal-difference forming means includes a plurality of comparators for forming said difference signals, respectively, one of said difference signals being associated with said transition from said light area to said dark area having a value below a maximum value obtained from each of the remaining difference signals, save the difference signal associated with the transition from said dark area to said light area.

11. An apparatus as claimed in claim 7, wherein said sectors are separated from one another by respective separation lines, the angular position of each sector being defined by a respective of said separation lines, each separation line subtending respective initial angles with said predetermined direction as viewed along a prearranged angular direction, and wherein said angle calculator further comprises
  switch means controlled by said contour-recognition signal for selecting the required difference signals and initial angles,
  a plurality of signal sources for generating electrical quantities representing said initial angles,
  dividing means for forming a quotient from the selected difference signals, and
  adding means for adding an electrical quantity corresponding to a selected initial angle to said quotient, thereby obtaining said contour-defining angle.

12. An apparatus as claimed in claim 7, wherein said scanning means comprises fiberoptic means including a plurality of fiberoptic bundles, and photoelectric transducer means post-coupled to said fiberoptic means, and wherein the light-receiving ends of said fiberoptic bundles are disposed near respective of said sectors.

* * * * *